E. M. HEYLMAN.
PLOW.
APPLICATION FILED OCT. 30, 1915.
1,200,106.
Patented Oct. 3, 1916.
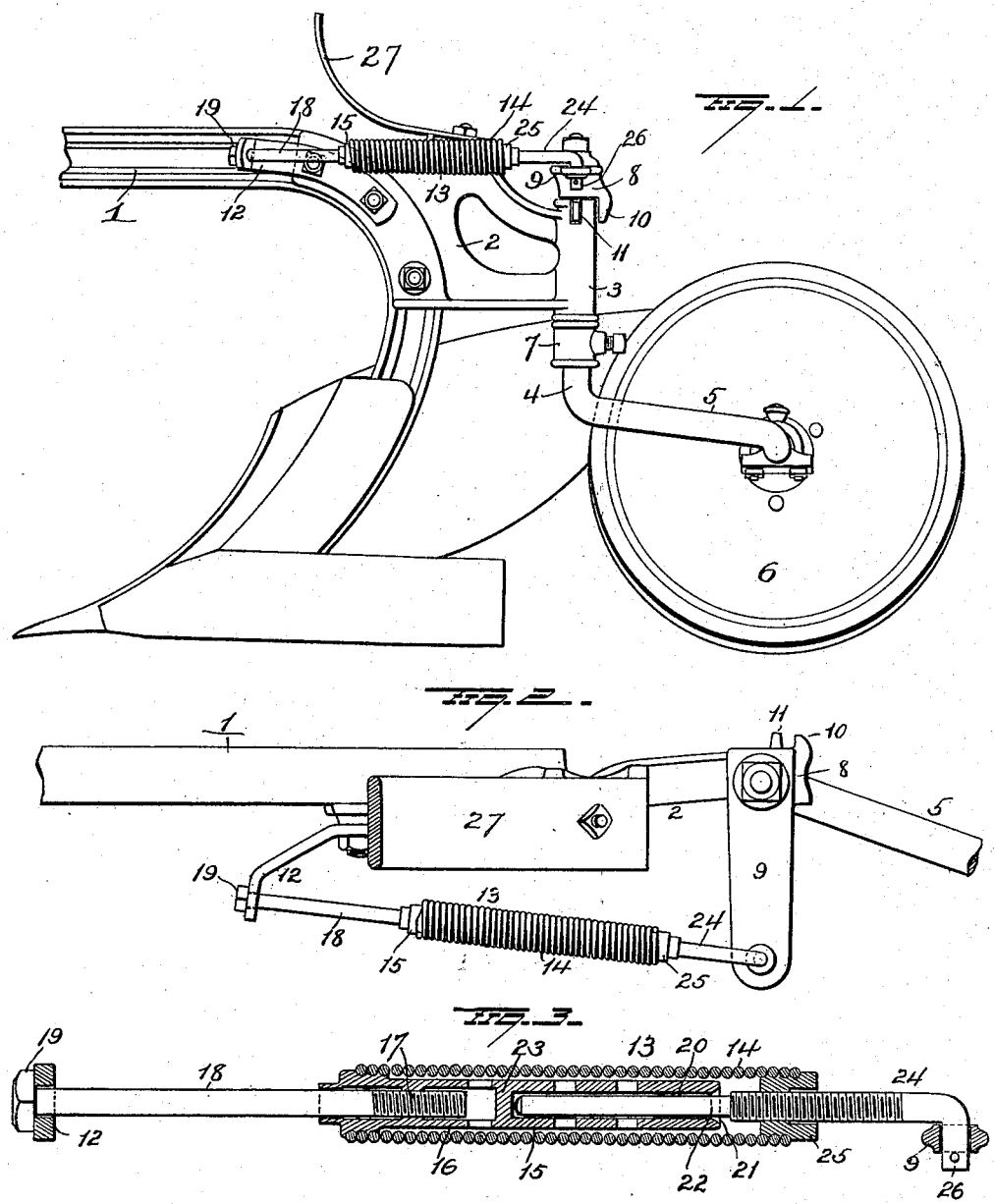
WITNESSES
E. Nottingham
G. F. Downing
INVENTOR
E. M. Heylman
By H. A. Seymour
Attorney

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

PLOW.

1,200,106.   Specification of Letters Patent.   Patented Oct. 3, 1916.

Application filed October 30, 1915. Serial No. 58,836.

*To all whom it may concern:*

Be it known that I, EDWARD M. HEYLMAN, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to plows and particularly to means which shall be adjustable and which will operate automatically to permit the rear wheel to properly caster when a turn of the plow is made either to the right or to the left and at the same time keep said rear wheel in the corner of the furrow.

The invention consists in the novel structure hereinafter described and particularly defined in the appended claims.

In the accompanying drawings, Figure 1 is a side elevation showing my improvements. Fig. 2 is a plan view, and Fig. 3 is an enlarged detail sectional view.

1 represents a portion of a plow beam, to the rear end of which a bracket 2 is securely bolted. This bracket projects an appreciable distance rearwardly of the plow beam and its standard and at its rear end is made with a tubular portion 3 which serves as a bearing for the vertical portion of an axle 4. Below its vertical portion, the axle is bent laterally and downwardly as at 5 and at the rear end of the portion 5, the axle is made with laterally projecting inclined spindle mounted in the hub of a rear caster wheel 6. A collar 7 is adjustably secured to the axle and serves to prevent the bracket 2 from dropping.

The hub 8 of an arm 9 is secured to the upper end of the axle and is provided with stops 10 to coöperate with stops 11 on the bracket 2 and thus limit the castering movements of the wheel.

A forwardly and laterally projecting arm 12 is fixed to the forward end of the bracket 2, and between this arm and the arm 9 on the axle, the adjustable controlling device 13 is connected. In constructing this device, I provide a coiled spring 14, into the forward end of which a core 15 is screwed, said core being of a length somewhat less than that of the spring. The core 15 may be made tubular and near its forward end is made with an internally threaded portion 16 through which the threaded portion 17 of a rod 18 passes. This rod projects some distance beyond the forward end of the core 15 and passes freely through a hole in the arm 12, the free forward end of said rod being provided with a head or nut 19. The rear end of the core 15 is made with a socket 20 having a beveled mouth 21 to facilitate the entrance into said socket of the forward end of a rod 22, and the forward end of said rod is somewhat rounded to further insure its entrance into the socket, while the forward end 23 of said socket constitutes a stop for the rod. The rod 22 is made with a threaded portion 24 passing through a threaded hole in a plug 25 screwed into the rear end of the spring 14, and the rear end of said rod 22 is made with a short arm 26 pivotally connected with the arm 9 on axle 4.

By adjusting the rod 22 in the plug 25 the tension of the spring 14 may be increased or decreased, and by adjusting the rod 18 relatively to the core 15, the position of the wheel 6 relatively to the furrow bank may be adjusted.

When the plow is turned to the left the rod 18 will slide freely through the hole in arm 12 and the rear wheel 6 will caster in the bracket 2, such movement being limited by one of the stops 10 engaging one of the stops 11. When the plow is turned to the right, the spring 14 will expand sufficiently to permit the other stop 10 to engage the other stop 11, and when the turn of the plow (in either direction) has been completed and the plow is again drawn forwardly, the spring 14 will operate to keep the rear wheel 6 in the corner of the furrow at all times. By telescoping the forward end of the rod 22 into the rear portion of the core 15, buckling of the spring 14 will be prevented, and as long as the rod 22 engages the stop 23 in the core 15, the distance between the head 19 on rod 18 and the connection of the rod 22 with the arm 9 always remains the same when the tension of the spring is either increased or decreased, thus avoiding necessity for adjusting the devices when the tension of the spring is changed.

The operation of my improvements to control the rear wheel being automatic, no attention on the part of the operator is necessary when the plow is to be turned, and thus all danger of breaking or straining of parts as might occur with mechanism requiring manual manipulation, is obviated.

A seat spring 27 may be secured upon the bracket 2.

Having fully described my invention what I claim as new and desire to secure by Letters-Patent, is:—

1. The combination with a plow frame, the axle of a rear caster wheel, and an arm on said axle, of a spring connection between said arm and plow frame, said spring connection having a sliding connection with the plow frame.

2. The combination with a plow frame, the axle of a rear caster wheel, and an arm on said axle, of a spring, a core secured in said spring, a rod adjustably connected with said core and movably connected with the plow frame, and a connection between said spring and the arm on said axle.

3. The combination with a plow frame, the axle of a rear caster wheel, and an arm secured to said axle, of a spring, a rod connected with one end of said spring and with the plow frame, a plug secured in the other end of the spring, and a rod adjustably connected with said plug and connected with the arm on said axle.

4. The combination with a plow frame, the axle of a rear caster wheel, and an arm on said axle, of a spring, a core secured in one end of said spring, an adjustable connection between said core and the plow frame, a plug secured in the other end of the spring, and a rod connected with the arm on the axle and adjustably connected with said plug, the forward end of said rod adapted to engage the rear end of said core.

5. The combination with a plow frame, the axle of a rear caster wheel, and an arm on said axle, of a spring, a core secured in one end of said spring and having a socket in its rear end, a rod connected with said core and movably connected with the plow frame, a plug secured in the other end of the spring, and a rod connected with the arm on the axle and adjustably connected with said plug, said rod having a part entering the socket in the core.

6. The combination with a plow frame, and a bracket secured to and projecting rearwardly therefrom, of a caster wheel axle mounted in said bracket, a caster wheel in which said axle is journaled, stops for limiting the turning movements of said axle, an arm secured to the axle, an arm secured to the plow frame, a spring, a rod projecting from one end of said spring and movably connected with the arm on the plow frame, and a rod projecting from the other end of the spring and connected with the arm on the axle.

In testimony whereof, I have signed this specification in the presence of two subscribing witnesses.

EDWARD M. HEYLMAN.

Witnesses:
CHAS. A. WEBSTER,
KATE E. BUCKLEY.